J. B. O'DONNELL.
SHOCK ABSORBING DEVICE.
APPLICATION FILED FEB. 25, 1914.
1,154,267.
Patented Sept. 21, 1915.
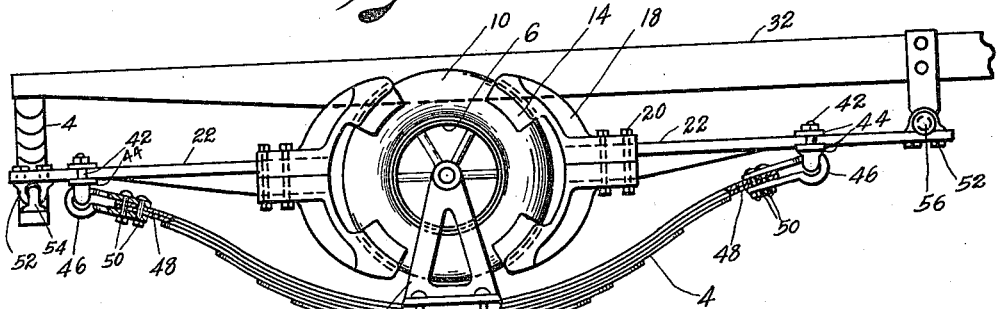
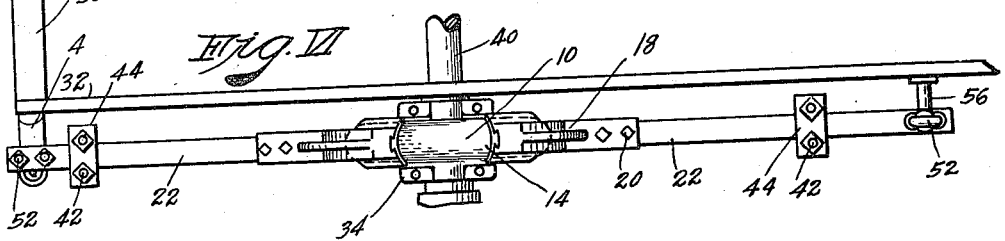
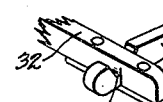
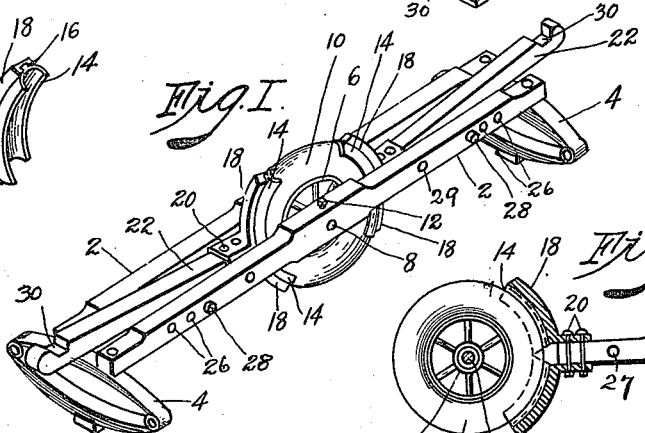
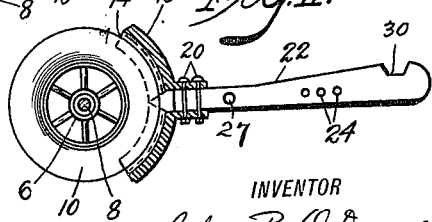
WITNESSES:
Edmund A Cahill
N. Gerard.
INVENTOR
John B. O'Donnell
BY
Chas V. Gerard
ATTORNEY
COLUMBIA PLANOGRAPH CO., WASHINGTON, D. C.

UNITED STATES PATENT OFFICE.

JOHN B. O'DONNELL, OF KANSAS CITY, MISSOURI, ASSIGNOR OF ONE-HALF TO JAMES S. STRONG, OF KANSAS CITY, MISSOURI.

SHOCK-ABSORBING DEVICE.

1,154,267.  Specification of Letters Patent.  Patented Sept. 21, 1915.

Application filed February 25, 1914. Serial No. 821,072.

*To all whom it may concern:*

Be it known that I, JOHN B. O'DONNELL, a citizen of the United States, residing at Kansas City, in the county of Jackson and State of Missouri, have invented a new and useful Shock-Absorbing Device, of which the following is a specification.

This invention relates to shock-absorbing devices, and more especially to those devices of this character which are used in connection with vehicles of various types, and the object in view is to devise a means of comparatively simple construction which will, when embodied in connection with a vehicle, serve the purpose now served by the pneumatic or equivalent wheel tires commonly employed.

A very serious problem presents itself to the automobile trade as to how to find a satisfactory substitute for the present arrangement of cushioning means which necessitates a pneumatic wheel tread, or some other cushioning tread almost equally expensive because of its complex construction. The present invention aims to solve this problem by means of a novel and peculiar form of cushioning construction provided intermediate the vehicle body and the axles, independent of the form of wheel tire employed, and of a character which will coöperate with the usual vehicle springs at all times, regardless of the direction of vibration of these springs.

With this general object in view, the invention will now be described with reference to the accompanying drawing showing two forms of construction embodying the proposed improvements.

In the drawing—Figure 1 is a perspective view representing the preferred form of the invention; Fig. 2 is an elevation of the cushioning element and one of the levers with its attached shoes shown in section; Fig. 3 is a perspective view of one of the shoes and brackets provided for each lever; Fig. 4 is a perspective detail of one of the lever connections with the vehicle frame; Figs. 5 and 6 are elevation and plan views, respectively, of a modified construction.

Having reference now to Figs. 1 to 4 of the drawing, illustrating the preferred form of the device, these figures show the device as comprising a pair of transverse supporting members 2, having their opposite ends mounted upon and secured to the vehicle springs 4. These members 2 are spaced slightly apart and form the frame work for carrying the cushioning element and connections to the vehicle body. This auxiliary cushioning element may be a resilient member of any desired form and construction suitable for the purpose, it being found, however, that a wheel 6 journaled between the members 2 upon a pin 8 and provided with a pneumatic tire 10 serves the purpose satisfactorily. When placed in position, the pin 8 is secured by means of a set screw 12. Lightly embracing the tire 10 at opposite sides of the wheel are two pairs of curved shoes 14 having dovetailed ribs 16 fitting in similarly formed grooves provided in the bracket members 18, which latter are removably clamped by means of bolts 20 to the inner ends of a pair of levers 22. Each of the levers 22 is provided intermediate its ends with a series of openings 24 corresponding to a similar series of openings 26 in each of the frame members 2, these sets of openings being for the purpose of adjustably accommodating a pair of pivot pins 28 whereby the fulcrums of the levers may be changed in accordance with the leverage desired to be exerted upon the cushioning element 10. The outer ends of the levers 22 are connected to the vehicle frame in any suitable manner, as by having the ends of the levers formed with notches 30 within which to seat the adjacent portions of the chassis frame 32 provided with notched portions so formed as to permit slight pivotal play of the levers whenever there is relative movement taking place between the adjacent portions of the axle and vehicle body. The levers 22 are also provided with the openings 27 adapted to register with similar openings 29 in the members 2, for the purpose of accommodating additional pins 28 should it ever be desired to lock either or both of said levers and dispense with the auxiliary cushioning action of the member 10. The above-described arrangement provides a strong and compact construction freely permitting all proper movements of the levers and at the same time forming guide passages which will prevent all excessive lateral vibration of the levers due to the lurching of the vehicle.

In Figs. 5 and 6 is shown a construction operating on the same general principle, but so arranged as to be mounted and connected up in a slightly different manner and with the cushioning member carried directly over the axle-supported portion of spring 4. In this modification, a bracket or stand 34 is clamped by bolts 36 to the clamping member 38 which embraces the mid-portion of the spring 4 and is carried by the axle 40. In this stand is journaled the wheel 6 carrying the cushioning element 10 embraced by the shoes 14 of brackets 18 removably clamped to the inner ends of the levers 22 which, in this instance, are fulcrumed by means of U-bolts 42 and plates 44, the U-bolts being pivotally connected with clips 46 secured to the outer ends of the upper longer leaves of the spring 4. The adjustment of the fulcrum in this construction is obtained by means of a series of openings 48 in the ends of the spring and bolts 50, whereby the clips 46 may be connected with different sets of such openings, it being understood that the U-bolts 42 must be reclamped to accommodate such adjustment. The outer ends of the levers 22 are pivotally linked to the chassis frame by means of U-bolts 52 engaging suitable connections on said frame, such as a U-bolt 54 at one end and of another transverse spring 4, and a hanger-extension 56 connected to the frame 32, the manner of connecting with the frame varying, of course, with the demands of the particular vehicle construction involved.

By means of the above-described forms of construction it will be observed that a shock-absorbing device is provided in which the cushioning member is located in such a relation to the spring or springs as to be subjected to a thrust for all vibrations of the spring, and that these thrusts are transmitted to the cushioning element through a lever the fulcrum of which is arranged to be adjusted so that the cushioning action of the device may be readily modified to suit either light or heavy loads. With the parts arranged as described and properly adjusted, the cushioning action thereof very closely simulates that to be derived from the usual automobile construction having a pneumatic wheel-tread. By having the cushioning member of the form shown and rotatably mounted, it may be conveniently shifted to distribute the wear over its entire periphery, and by arranging the axes of the levers and cushioning member parallel, the contacting shoes are presented in the most appropriate relation for properly and effectively embracing the sides of the cushioning element. Moreover, by merely detaching one shoe from each of the levers,—for example, the upper shoes and brackets in Fig. 1, the cushioning member may be conveniently removed from position for repairs or for renewal of the cushioning element, as may be desired.

It will therefore be apparent that a very simple, compact and durable construction has been devised for carrying out the objects of the invention, and reservation is made of the right to such modifications and departures in form as may fall within the scope of the following claims.

Claims:

1. The combination with a vehicle having a yielding cushioning means intermediate the vehicle body and the axle, of an auxiliary cushioning member, and connections between said cushioning means and auxiliary member whereby a leverage action is exerted upon the latter for all vibratory movements of the former.

2. The combination with a vehicle having a spring intermediate the vehicle body and the axle, of an auxiliary cushioning member, and a lever connected with said spring and provided with contacting members embracing opposite sides of said auxiliary member, said lever being arranged to exert pressure upon said auxiliary member through one or the other of said contacting members for every relative approaching or separating movement of the body and axle.

3. The combination with a vehicle having a spring intermediate the vehicle body and the axle, of an auxiliary cushioning member, a lever connected with said spring and provided with contacting members embracing opposite sides of said auxiliary cushioning member, said lever being arranged to exert pressure upon said auxiliary member through one or the other of said contacting members for every relative approaching or separating movement of the body and axle, and means permitting variation of the leverage action of said lever.

4. The combination with a vehicle having springs intermediate the vehicle body and axle and at opposite sides of said body, of a single auxiliary cushioning member, contact members embracing opposite sides of said auxiliary member, and means connected with said contact members and operated by all relative approaching and separating movements of said body and axle for causing said auxiliary member to coöperate in the cushioning action of said springs.

5. The combination with a vehicle having springs intermediate the vehicle body and axle and at opposite sides of said body, of a single auxiliary cushioning member, contact members embracing opposite sides of said auxiliary member, and connections between said contact members and both of said springs whereby said auxiliary member is caused to coöperate therewith for all vibrations of either spring.

6. The combination with a vehicle having springs intermediate the vehicle body and axle and at opposite sides of said body, of a single auxiliary cushioning member, and a lever connected to each of said springs, each lever being provided with contact members embracing opposite sides of said auxiliary cushioning member.

7. In a shock-absorbing device, the combination of a yielding cushioning means, an auxiliary cushioning member, and a lever connected with said cushioning means and provided with contact members arranged to grip one or the other of the opposite sides of said auxiliary member in response to all vibrations of the cushioning means.

8. In a shock-absorbing device, the combination of a cushioning spring, an auxiliary cushioning member, a lever connected with said spring and provided with contact members arranged to grip one or the other of the opposite sides of said auxiliary member in response to all vibrations of said spring, and means permitting variation of the leverage action of said lever.

9. In a shock-absorber, the combination of a yielding cushioning means, a wheel rotatably mounted and provided with a cushioning periphery, and a lever fulcrumed about an axis parallel with the axis of said wheel, said lever being provided with a connection with said cushioning means and with contact members for gripping opposite sides of the periphery of said wheel in response to the movements of said cushioning means.

10. In a shock-absorbing device, the combination with a vehicle having springs intermediate the vehicle body and axle thereof and at opposite sides of said body, of a pair of transverse supporting frame members spaced apart and connecting said springs, a wheel provided with a cushioning periphery and mounted rotatably over the mid-portions of said frame members with its axis at right-angles thereto, a pair of levers pivoted between said frame members at opposite sides of said wheel and provided with contact members for gripping opposite sides of the periphery thereof, and pivotal connections between the outer ends of said levers and the vehicle frame.

11. The combination with a vehicle having a spring intermediate the vehicle body and the axle, of a curved auxiliary cushioning member, curved shoes adapted to embrace said auxiliary member at opposite points thereon, and a lever carrying said shoes and operative to cause the latter to exert pressure on the auxiliary member in response to all relative movements between said body and axle.

12. In a shock-absorbing device, the combination of a cushioning means, a pair of supporting frame members spaced apart and connected to said cushioning means, an auxiliary cushioning member carried by said frame members, and a lever pivoted between said frame members and provided with shoes for engaging said auxiliary member, said lever and frame members being provided with bolt-openings adapted to register to permit locking of said lever against pivotal movement.

JOHN B. O'DONNELL.

Witnesses:
CONGER R. SMITH,
CHAS. W. GERARD.

Copies of this patent may be obtained for five cents each, by addressing the "Commissioner of Patents, Washington, D. C."